United States Patent Office 3,702,838
Patented Nov. 14, 1972

3,702,838
LEWIS ACID CATALYZED DIACYL CHLORIDE-DIPHENOL POLYESTERIFICATION
Donald Richard Wilson, Fairport, N.Y., assignor to E. I. du Pont de Nemours and Company, Wilmington, Del.
No Drawing. Continuation-in-part of application Ser. No. 779,090, Oct. 23, 1968. This application Aug. 26, 1970, Ser. No. 67,251
Int. Cl. C08g 17/003
U.S. Cl. 260—47 C                24 Claims

ABSTRACT OF THE DISCLOSURE

Reaction of a diacyl chloride and a diphenol or a bisphenol is conducted under anhydrous conditions, in a chlorinated organic solvent in the presence of a catalytic amount of anhydrous aluminum chloride, anhydrous aluminum bromide, anhydrous aluminum iodide, antimony pentafloride, antimony pentachloride, antimony pentabromide, ferric chloride, ferric bromide, indium trichloride, indium tribromide, zirconium chloride, zirconium bromide, stannic chloride, stannic bromide, titanum tetrachloride, titanium tetrabromide, gallium trichloride, gallium tribromide, isoquinoline, quinuclidine hydrochloride, a trialkyl phosphine, a triaryl phosphine or an alkyl-substituted imidazole.

CROSS-REFERENCE TO RELATED APPLICATION

This application is a continuation-in-part of my copending application Ser. No. 770,090, filed Oct. 23, 1968 and now abandoned.

BACKGROUND OF THE INVENTION

This invention relates to the preparation of polyesters by the reaction of a diacyl chloride and a diphenol or a bisphenol.

The preparation of polyesters by the reaction of a diacyl halide and a diphenol or a bisphenol is known in the art. For example, an interfacial polymerization method is described in U.S. Patent 3,234,167. However, such an interfacial polymerization is not suitable for large scale commercial operations, because it is necessary to conduct a triple separation of the two solvents and the polyester before the polyester may be further processed.

Another known process comprises reacting the diacyl halide and diphenol or bisphenol in a single solvent and in the presence of a certain catalyst such as quaternary ammonium salt or a phosphonium salt. If this latter process is conducted at relatively low temperatures, i.e., less than about 100° C., it is necessary to use an acid acceptor such as a tertiary amine. However, the acid acceptor forms an insoluble salt during the polymerization reaction and must be filtered from the viscous polymer solution. The acid acceptor can be eliminated by use of higher temperatures. However, excessively long reaction times are required with the known catalysts, and, in addition, at higher temperatures substantial amounts of relatively intractible crystallized polymer unsuitable for extrusion through spinneret orifices often precipitate during polymerization and subsequent processing steps.

SUMMARY OF THE INVENTION

The present invention provides a process for preparing a polyester comprising mixing a diacyl chloride and a diphenol or a bisphenol under anhydrous conditions in a chlorinated solvent capable of dissolving the resulting polyester, and in the presence of a catalytic amount of a catalyst that is a Lewis acid selected from the group consisting of anhydrous aluminum chloride, anhydrous aluminum bromide, anhydrous aluminum iodide, antimony pentafluoride, antimony pentachloride, antimony pentabromide, ferric chloride, ferric bromide, indium trichloride, indium tribromide, zirconium chloride, zirconium bromide, stannic chloride, stannic bromide, titanium tetrachloride, titanium tetrabromide, gallium trichloride and gallium tribromide, or a Lewis base selected from the group consisting of isoquinoline, quinuclidine hydrochloride, a trialkyl phosphine, a triaryl phosphine and an alkyl-substituted imidazole, for a period of time sufficient to produce said polyester.

This invention provides a relatively rapid polymerization suitable for commercial operations. In addition, under many conditions, the resulting reaction mixture can be used directly for extrusion into shaped articles, such as filaments, without the necessity of first isolating the polyester.

DESCRIPTION OF THE PREFERRED EMBODIMENTS

The diphenols and bisphenols that are suitable for use in this invention have the formula:

(I) 

or (II) 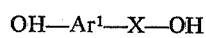

wherein X represents a divalent radical of the formula:

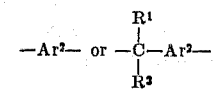

$Ar^1$ and $Ar^2$ represent the same or different divalent aromatic radicals, preferably phenylene, with each OH group shown in Formulea I and II being attached directly to a carbon atom in the ring of said divalent aromatic radicals, and, optionally, one or more of the remaining carbon atoms in said ring may bear substituents other than hydrogen that are non-reactive in the polymerization reaction, preferably selected from the group of halogen, $R^3$ and $OR^3$; and $R^1$, $R^2$ and $R^3$ are the same or different monovalent radicals, preferably selected from the group of hydrogen, alkyl, cycloalkyl and aryl; optionally, any carbon atom of $R^1$, $R^2$ or $R^3$ may bear one or more halogen atoms.

Suitable diphenols and bisphenols include, for example:

bis(4-hydroxyphenyl)-methane
bis(4-hydroxy-3-methylphenyl)-methane
bis(4-hydroxy-3,5-dichlorophenyl)-methane
bis(4-hydroxy-3,5-dibromophenyl)-methane
bis(4-hydroxy-3,5-difluorophenyl)-methane
1,1-bis(4-hydroxyphenyl)-ethane
2,2-bis(4-hydroxyphenyl)-propane
2,2-bis(4-hydroxy-3-methylphenyl)-propane
2,2-bis(4-hydroxy-3-chlorophenyl)-propane
2,2-bis(4-hydroxy-3,5-dichlorophenyl)-propane
2,2-bis(4-hydroxy-3,5-dibromophenyl)-propane
2,2-bis(4-hydroxy-3,5-dichlorophenyl)-hexafluoropropane
2,2-bis(4-hydroxynaphthyl)-propane
bis(4-hydroxyphenyl)-phenylmethane
bis(4-hydroxyphenyl)-diphenylmethane
bis(4-hydroxyphenyl)-4'-methylphenylmethane
1,1-bis(4-hydroxyphenyl)-2,2,2-trichloroethane
bis(4-hydroxyphenyl)-(4'-chlorophenyl)-methane
1,1-bis(4-hydroxyphenyl)-cyclohexane
bis(4-hydroxyphenyl)-cyclohexylmethane
4,4'-dihydroxydiphenyl
2,2'-dihydroxydiphenyl dihydroxynaphthalenes such as 2,6-dihydroxynaphthalene
hydroquinone
resorcinol
2,6-dihydroxytoluene
2,6-dihydroxychlorobenzene
3,6-dihydroxytoluene More than one of such diphenols and bisphenols may be used together, if desired.

The diacyl chlorides that are suitable for use in this invention have the formula:

III. 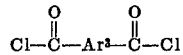

or

IV. 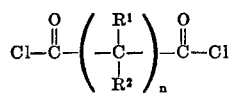

or

V. 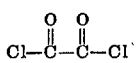

wherein $R^1$ and $R^2$ represent radicals as defined above for Formulae I and II, $n$ is an integer of 1 to 10, and $Ar^3$ represents a meta- or para-phenylene radical. Suitable diacyl chlorides include, for example, isophthaloyl chloride and terephthaloyl chloride. More than one diacyl chloride may be used, if desired. The combination of terephthaloyl chloride with at least 10% by weight of isophthaloyl chloride is preferred, since the former reagent, when reacted with the present di- or bisphenols, is likely to produce a polymer which will not dissolve in the solvents disclosed hereinafter.

The solvents for the process are halogenated organic liquids. Chlorinated aliphatic or aromatic hydrocarbon solvents are preferred. A preferred species is 1,1,2,2-tetrachloroethane, hereinafter referred to as sym-tetrachloroethane. All of the present polymers form stable solutions in sym-tetrachloroethane at temperatures from ambient to the boiling point of the solvent (146° C.).

Stable solutions of the homopolymer wherein the repeating unit is represented by the structural formula below:

VI. 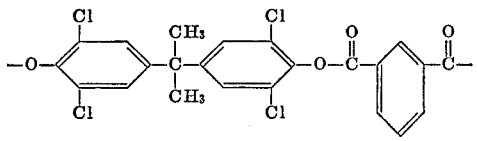

may be prepared by using other chlorinated hydrocarbon solvents such as chloroform, o-dichlorobenzene and 1,1,2-trichloroethane if the solutions are not heated above 25° C. or stored for periods longer than about 8 hours, after which time precipitation of crystalline polymer may occur.

Solutions of copolymers wherein a portion of the repeating units is represented by Formula VI, and the remainder is derived from the same bisphenol and terephthaloyl chloride, in the aforementioned chlorinated hydrocarbon solvents are more stable than homopolymer solutions described above. For example, the copolymer prepared using from 30 to 90% isophthaloyl chloride and the remainder terephthaloyl chloride forms solutions in o-dichlorobenzene which are stable for several days; copolymer precipitating may be redissolved by heating.

Polymers derived from di- or bis-phenols and aliphatic diacyl chlorides are soluble in 1,1,2-trichloroethane so long as the solution temperature is maintained above about 80° C. Higher temperatures may be required to obtain stable solutions using other chlorinated solvents, e.g., o-dichlorobenzene.

The preferred catalysts for use in this invention are the chlorides and bromides of aluminum and the chlorides, bromides and fluorides of pentavalent antimony. These Lewis acid catalysts yield high molecular weight polymer using relatively short reaction times. In addition, these catalysts do not impart undesirable color nor do they adversely affect the stability of the polymer toward irradiation by ultraviolet light. Other useful Lewis acid catalysts include the chlorides and bromides of zirconium, tetravalent titanium, trivalent indium, trivalent gallium, trivalent iron and tetravalent tin. Various organic Lewis bases that produce polymer useful for preparing fibers include isoquinoline, quinuclidine hydrochloride, and trisubstituted phosphines having the formula:

VII. 

wherein $R^4$, $R^5$ and $R^6$ represent the same or different monovalent alkyl or aryl radicals containing 1 to 6 carbon atoms, preferably butyl or phenyl radicals. Another group of suitable Lewis base catalysts are the alkyl-substituted imidazoles having the formula:

VIII. 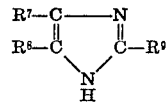

wherein $R^7$, $R^8$ and $R^9$ represent hydrogen or the same or different monovalent alkyl radicals containing 1 to 10 carbon atoms, with at least one of $R^7$, $R^8$ and $R^9$ being such an alkyl radical. Suitable alkyl-substituted imidazoles include, for example, 2-methyl imidazole and 2-ethyl-4-methyl imidazole. These catalysts catalyze the polycondensation reaction whereby the diacyl chloride and the diphenol or bisphenol combine to form polymer chains and yield free HCl, which is removed.

The process of this invention should be carried out under anhydrous conditions to obtain high molecular weight polyesters. For example, the reaction vessel, auxiliary equipment, solvent and reactants are carefully dried prior to use and the reaction vessel is continuously swept with a stream of dry, inert gas, e.g., nitrogen, during the polymerization. In addition to excluding moisture, this gas will remove substantially all of the hydrogen chloride produced as a by-product of the polymerization reaction, the hydrogen chloride being only sparingly soluble in sym-tetrachloroethane.

The polymerization reaction may be carried out by combining substantially equimolar portions of the desired diphenol or bisphenol and diacyl chloride(s) together with catalyst and solvent in a reaction vessel under anhydrous conditions. When the catalyst is antimony pentachloride, antimony pentafluoride or antimony pentabromide, polymer exhibiting an inherent viscosity of 0.5 or higher is obtained in one or two hours at ambient temperature. These catalysts are unique in that a useful rate of polymerization is obtained at room temperature. Using the other catalysts of this invention, the polymerization will proceed at room temperature, but it is preferred to heat the reaction mixture. Polyesters derived from aromatic diacyl chlorides corresponding to Formula III above are preferably prepared at the reflux temperature of the solvent; for example, 146° C. when sym-tetrachloroethane is used. The use of antimony pentachloride, antimony pentafluoride or antimony pentabromide which are effective catalysts at room temperature, makes it possible to employ chlorinated solvents other than the preferred sym-tetrachloroethane. Aliphatic diacyl chlorides corresponding to Formulae IV and V above may be readily reacted to form polyesters at temperatures below about 100° C. using sym-tetrachloroethane as the solvent.

In accordance with one preferred procedure, the diphenol or bisphenol is dissolved in the solvent and one or more diacyl chlorides are added as a single portion or gradually as the polymerization proceeds. Diacyl chlorides that are solid at ambient temperature may be added as a solution in sym-tetrachloroethane.

Depending upon the monomers chosen, the reaction time required to obtain a molecular weight suitable for fiber formation will be up to about 24 hours. Using aluminum chloride, suitable molecular weights are attained in as short a time as one hour. It is preferable to stir the reaction mixture during polymerization, thereby increasing the area of contact between monomers and catalyst. As mentioned above, removal of the hydrogen chloride generated during the reaction will be facilitated if a flow of inert gas such as nitrogen is maintained throughout the course of polymerization. Under these conditions the presence of an acid acceptor, such as tertiary amine, is not required.

Reactions employing the chlorides or bromides of aluminum or pentavalent antimony or antimony pentafluoride as a catalyst are preferably terminated by adding sufficient water to completely hydrolyze the catalyst.

Polyesters of molecular weight sufficiently high to be fiber-forming may be produced. As described in U.S. Pat. 3,234,167, the molecular weight of polymers forming by the reaction of a diacyl chloride and a diphenol may range from 10,000 to 200,000. The molecular weight is preferably at least about 50,000.

Polymer solutions prepared as described above and which exhibit a viscosity suitable for fiber formation may be extruded into textile denier filaments using conventional dry spinning techniques and equipment. Dry spinning may be accomplished by extruding the polymerization reaction mixture, preferably maintained at about 80° C. to 100° C., into a heated current of gas whereupon evaporation of solvent occurs and fibers are formed. It may be necessary to dilute the reaction mixture by addition of sym-tetrachloroethane or to remove solvent in order to attain the desired level of solution viscosity. The solvent is readily removed from the filaments by extraction using aliphatic alcohols, e.g., methanol.

An alternative procedure for preparing polymers derived from aliphatic diacyl halides comprises using 1,1,2-trichloroethane as the polymerization medium and then diluting or concentrating the resultant solution to obtain a viscosity suitable for fiber formation. The solution temperature should be maintained above about 80° C. to avoid a reversible gel formation (i.e., any gel which forms can be redissolved by heating the mixture above about 80° C.). 1,1,2-trichloroethane is less toxic than sym-tetrachloroethane, and is more easily extracted from the filaments.

Bulk polymer may be isolated by pouring the polymerization reaction mixture into a suitable coagulent, e.g., n-hexane, preferably in a blender with rapid stirring to obtain the polymer as a fine powder. Polymer in this form may be readily melt spun using conventional techniques and apparatus. Melt spinning is particularly applicable to those polyesters derived from aliphatic or cyclo-aliphatic diacyl chlorides, since these polymers melt below about 300° C.

Filaments containing polyesters prepared using chlorinated bisphenols, preferably where the chlorine atoms are located at all positions adjacent to the hydroxyl groups, are especially suitable for incorporation into wash-wear fabrics. In addition, the filaments are highly fire resistant.

The following examples are illustrative of the practice of the invention. In these examples all parts and percentages are expressed on a weight basis, unless otherwise indicated. Inherent viscosities ($\eta$ inh.) are determined in accordance with the following equation:

$$\eta_{inh.} = \frac{\ln \eta_{rel.}}{C}$$

The relative viscosity ($\eta_{rel.}$) is determined by dividing the flow time in a capillary viscometer of a dilute solution of the polymer by the flow time for the pure solvent. The concentration (C) used in the examples is 0.5 gram of polymer per 100 cc. of solvent and the measurements are made at 30° C. The solvent used to determine the viscosity is indicated in each instance.

The approximate molecular weight of the polymer may be determined as described by Sorenson and Campbell, Preparative Methods of Polymer Chemistry (1961), p. 35. In accordance therewith the molecular weight of polyesters of this invention having an inherent viscosity of about .4 is calculated to be about 50,000. A higher inherent viscosity indicates a higher molecular weight.

The tenacity, elongation, and modulus of the filaments disclosed in the examples are determined using procedures D-1380 and D-76 published by the American Society for Testing Materials (ASTM). The work recovery of the filaments is determined using a modification of ASTM procedure D-1774-61T. The modification comprises holding the filaments at maximum elongation for 30 seconds, after which the clamps are released and the filaments allowed to relax for 1.5 minutes before being subjected to the next testing cycle.

Example I

This example illustrates the preparation of a polyester, and filaments therefrom, using 2,2-bis(4-hydroxy-3,5-dichlorophenyl)propane (TeClDPP), isophthaloyl chloride (ICl), using anhydrous aluminum chloride ($AlCl_3$) as the catalyst. The polyester so produced is poly[4,4'-isopropylidene-bis(2,6-dichlorophenyl)isophthalate].

All assembling of apparatus and transfer of reagents is carried out in an enclosed chamber under an atmosphere of dry nitrogen. The reaction vessel and auxiliary equipment are pre-dried in a 160° oven overnight. Into a 2 liter-capacity resin kettle equipped with a Teflon®-coated spiral blade stirrer, a Friedrich condenser and a nitrogen inlet tube terminating above the surface of the reaction mixture, are placed 183.0 g. (0.50 mole) of TeClDPP, 1 liter of sym-tetrachloroethane, 0.72 g. ($5.4 \times 10^{-3}$ moles) of reagent grade anhydrous aluminum chloride and 101.6 g. (0.50 mole) of ICl. The apparatus is connected to a nitrogen source and stirrer motor. The reaction mixture is kept under positive nitrogen pressure by attachment of a U-tube bubbler (containing a column of mercury, 1 cm. high) to the condenser top. The rate of nitrogen flow is adjusted during the reaction to keep it at the maximum consistent with a negligible loss of solvent. The reaction mixture is stirred vigorously and refluxing of solvent is continued for 1 hour by immersion in a 175° C. oil bath. The resulting viscous polymer solution is allowed to cool, after which 1.0 cc. of water is added with stirring to hydrolyze the catalyst. The resulting solution contains about 25 g. of polymer/100 ml. of solvent. Filaments are obtained by extruding the polymer solution into a nitrogen atmosphere. Spinning conditions are as follows:

solution temperature—80° C.
cell temperature—180° C.
spinneret orifice size—0.006 in. (0.015 cm.)
spinning speed—100 yd./min. (91 m./min.)
spin stretch—3.5

As-spun filaments are drawn 2.8 times in a 12 p.s.i./steam (840 g./cm.²) atmosphere, dried on a heated roll at 175° C. to 185° C. with 45 seconds residence time, after which they are drawn over a hot plate at 270° C.

The filaments have the following properties:

Average denier _____ 1.6
Tenacity (g./den.) _____ 2.6
Elongation (percent) _____ 17
Initial modulus (g./den.) _____ 41
Work recovery (percent) from:
    3% elongation _____ 73
    5% elongation _____ 61

Example II

This example illustrates the preparation of a polyester, and the filaments therefrom, using TeClDPP, adipyl chloride and anhydrous aluminum chloride as a catalyst.

Into a 1-liter-capacity resin kettle equipped with a Teflon®-coated spiral blade stirrer, Friedrich condenser, and nitrogen inlet tube are placed 109.82 g. (0.300 mole) of TeClDPP, 600 cc. of sym-tetrachloroethane, 0.8 g. ($6.0 \times 10^{-3}$ moles) of reagent grade anhydrous $AlCl_3$, and 55.13 g. (0.301 mole) freshly distilled adipyl chloride. The resin kettle is placed in an oil bath maintained at 80° C. and connected to a nitrogen source and a motor. After 20 hours 1 cc. of water is added to hydrolyze the catalyst. Stirring is continued for an additional 3 hours. The yield is 133 g. of polymer having $\eta_{inh.} = 0.73$ (measured in sym-tetrachloroethane) and a melting point of 255° C. as determined using differential thermal analysis.

Filaments are obtained by dissolving the isolated polymer, precipitated using methanol and washed with water in 1,1,2-trichloroethane at 105° C. (16% solids) and extruding the solution as described in Example I. Spinning conditions are as follows:

solution temperature—95° C.
cell temperature—145° C.
spinneret orifice size—0.005 in. (0.013 cm.)
spinning speed—138 yd./min. (126 m./min.)

After being drawn 4.2 times at 155° C. over a curved plate and heat set in a taut condition for 1 hour at 165° C., the filaments exhibit the following properties:

| | |
|---|---|
| Average denier | 3.3 |
| Tenacity (g./den.) | 2.6 |
| Elongation (percent) | 39 |
| Initial modulus (g./den.) | 22 |
| Work recovery (percent) from: | |
| 2% elongation | 96 |
| 3% elongation | 90 |
| 5% elongation | 76 |
| 10% elongation | 52 |

The properties are determined as described hereinbefore.

Example III

This example illustrates the preparation of a polyester using TeClDPP, isophthaloyl chloride (ICl) and tributyl phosphine as a catalyst.

In an enclosed chamber under a nitrogen atmosphere, 9.15 g. (0.025 mole) of TeClDPP, 5.08 g. (0.025 mole) of ICl, 0.4 cc. ($1.6 \times 10^{-3}$ moles) of tributyl phosphine and 50 cc. of sym-tetrachloroethane are placed in a previously dried 100 cc. capacity round bottomed flask with side arm capillary, nitrogen bleed and condenser. The apparatus is removed from the chamber and the contents are maintained under a constant positive pressure of nitrogen. The flask is then immersed in a 175° C. to 185° C. oil bath, which is maintained at this temperature for 24 hours. The polymer is precipitated from solution by pouring into 300 cc. of rapidly stirred hexane in a blender. The polymer is then washed successively with denatured ethyl alcohol, a mixture comprising equal volumes of water and denatured ethyl alcohol and finally with water. After being dried overnight in a vacuum oven at a temperature of 80° C., the polymer exhibits an inherent viscosity of 0.81 in sym-tetrachloroethane.

Example IV

This example illustrates the preparation of a polyester using TeClDPP, isophthaloyl chloride (ICl) with isoquinoline as a catalyst.

Following the procedure of Example III, a polyester is prepared by reacting 9.15 g. (0.025 mole) of TeClDPP, 5.08 g. (0.025 mole) of ICl, 0.26 cc. ($2.2 \times 10^{-3}$ moles) of isoquinoline and 50 cc. of sym-tetrachloroethane. After being dried overnight in a vacuum oven at a temperature of 80° C., the polymer exhibits an inherent viscosity of 0.80 in sym-tetrachloroethane.

Example V

This example illustrates the preparation of a polyester using TeClDPP, isophthaloyl chloride (ICl) and 2-ethyl-4-methyl imidazole as a catalyst. Using the procedure of Example III, a polyester is prepared using 9.15 g. (0.025 mole) of TeClDPP, 5.08 g. (0.025 mole) of ICl, 0.22 g. ($2 \times 10^{-3}$ moles) of 2-ethyl-4-methyl imidazole. After drying overnight in a vacuum oven at a temperature of 80° C., the polymer exhibits an inherent viscosity of 0.74 in sym-tetrachloroethane.

Example VI

This example illustrates the preparation of a polyester, and filaments therefrom using TeClDPP, isophthaloyl chloride (ICl) and anhydrous aluminum chloride ($AlCl_3$) as a catalyst.

Into a dry 50-gallon capacity glass-lined kettle equipped with glass-coated stirrer, condenser and nitrogen inlet are placed 27,450 g. (75 moles) of TeClDPP, 35 gallons of sym-tetrachloroethane, 108 g. (0.81 mole) of reagent grade anhydrous aluminum chloride and 15,240 g. (75 moles) of ICI. The reaction mixture is kept under nitrogen and is vigorously stirred while heated under reflux for 8 hours. The resulting polymer solution is allowed to cool to 100° C. after which 150 cc. of water is added with stirring to hydrolyze the catalyst. The polymer exhibits an inherent viscosity of 0.46 in sym-tetrachloroethane. Filaments are then spun from the polymer.

Example VII

This example illustrates the preparation of a polyester using TeClDPP, isophthaloyl chloride (ICl) and antimony pentachloride ($SbCl_5$) as a catalyst.

Into a 2-liter capacity resin kettle equipped with a Teflon®-coated spiral blade stirrer, Friedrich condenser, and nitrogen inlet tube are placed 228.75 g. (0.63 mole) of TeClDPP, 127.00 g. (0.63 mole) of isophthaloyl chloride, 1 liter of sym-tetrachloroethane and 2 cc. (0.0156 mole) of reagent grade antimony pentachloride. After the resin kettle is removed from the dry box, it is placed in the hood and connected to a nitrogen source and motor. After 2 hours of stirring at room temperature, 1 cc. of water is added to hydrolyze the catalyst. Stirring is continued for an additional 2 hours. The resulting polymer yields an inherent viscosity (measured in sym-tetrachloroethane) of 0.63.

Example VIII

This example illustrates the preparation of a polyester using TeClDPP, isophthaloyl chloride (ICl) and stannic chloride ($SnCl_4$) as a catalyst. Using the procedure of Example III, a polyester is prepared using 9.15 g. (0.025 mole) of TeClDPP, 5.08 g. (0.025 mole) of ICl, 0.23 cc. ($2 \times 10^{-3}$ moles) of $SnCl_4$ and 50 cc. of sym-tetrachloroethane. After drying overnight in a vacuum oven at 80° C., the polymer exhibits an inherent viscosity of 0.40 in sym-tetrachloroethane.

Example IX

This example illustrates the preparation of a polyester using TeClDPP, isophthaloyl chloride (ICl) and quinuclidine hydrochloride (QHCl) as a catalyst. Using the procedure of Example III, a polyester is prepared using 9.15 g. (0.025 mole) of TeClDPP, 5.08 g. (0.025 mole) of ICl, 0.3 g. ($2 \times 10^{-3}$ moles) of QHCl and 50 cc. of sym-tetrachloroethane. After drying overnight in a vacuum oven at 80° C., the polymer exhibits an inherent viscosity of 0.40 in sym-tetrachloroethane.

Example X

This example illustrates the preparation of a polyester using TeClDPP, isophthaloyl chloride (ICl) and titanium tetrachloride (TiCl$_4$) as a catalyst. Using the procedure of Example III, a polyester is prepared using 9.15 g. (0.025 mole) of TeClDPP, 5.08 g. (0.025 mole) of ICl, 0.22 cc. (2×10$^{-3}$ moles) of TiCl$_4$ and 50 cc. of sym-tetrachloroethane. After drying overnight in a vacuum oven at 80° C., the polymer exhibits an inherent viscosity of 0.37 in sym-tetrachloroethane.

Example XI

This example illustrates the preparation of a polyester using TeClDPP, isophthaloyl chloride (ICl) and ferric chloride (FeCl$_3$) as a catalyst.

Into a 300 cc. capacity resin kettle equipped with a condenser, glass stirrer and nitrogen inlet tube are placed 18.3 g. (0.05 mole) TeClDPP, 10.2 g. (0.05 mole) of isophthaloyl chloride, 100 cc. of sym-tetrachloroethane and 0.08 g. (5×10$^{-4}$ moles) of FeCl$_3$. After the resin kettle is removed from the dry box, it is placed in the hood and connected to a nitrogen source and motor. After three hours, the resin kettle is placed in an oil bath maintained at 175° C. for about one hour. The isolated polymer exhibits an inherent viscosity of 0.40 measured in sym-tetrachloroethane.

Example XII

This example illustrates the preparation of a polyester using TeClDPP, isophthaloyl chloride (ICl) and anhydrous indium trichloride.

In an enclosed chamber under a dry nitrogen atmosphere 45.7 g. (0.125 mole) of TeClDPP, 0.30 g. (1.35×10$^{-3}$ moles) of anhydrous indium trichloride, 250 ml. of sym-tetrachloroethane and 25.4 g. (0.125 mole) of ICl are placed in a previously dried 500 cc. capacity resin kettle equipped with a Teflon®-coated egg beater stirrer and Teflon® bushing, a Friedrich condenser and a nitrogen inlet terminating above the surface of the reaction mixture. The apparatus is removed from the chamber and the contents are maintained under a positive nitrogen flow. The reaction mixture is stirred vigorously and refluxing of solvent is continued for 2.0 hours by immersion in a preheated 165° C. to 175° C. oil bath. The resulting colorless, very viscous polymer solution is allowed to cool, after which 1.0 cc. of water is added with stirring to hydrolyze the catalyst. Polymer is isolated by pouring the viscous dope into n-hexane (Waring Blendor), and washing with methanol in blender. After overnight drying in a vacuum oven at 120° C., the polymer exhibits an inherent viscosity of 0.77 in sym-tetrachloroethane.

Example XIII

This example illustrates the preparation of a polyester using TeClDPP, isophthaloyl chloride (ICl) and anhydrous zirconium chloride (ZrCl$_4$). Using the procedure of Example XII, a polyester is prepared using 45.7 g. (0.125 mole) of TeClDPP, 25.4 g. (0.125 mole) of ICl, 0.31 g. (1.33×10$^{-3}$ moles) of anhydrous zirconium chloride and 250 cc. of sym-tetrachloroethane. After drying overnight in a vacuum oven at 120° C., the polymer exhibits an inherent viscosity of 0.73 in sym-tetrachloroethane.

Example XIV

This example illustrates the preparation of a polyester using TeClDPP, isophthaloyl chloride (ICl) and anhydrous gallium trichloride (GaCl$_3$). Using the procedure outlined in Example XIII, a polyester is prepared using 45.7 g. (0.125 mole) of TeClDPP, 25.4 g. (0.125 mole) of ICl, 0.24 g. (1.36×10$^{-3}$ moles) of anhydrous gallium trichloride and 250 cc. of sym-tetrachloroethane. After drying overnight in a vacuum oven at 120° C., the polymer exhibits an inherent viscosity of 0.85 in sym-tetrachloroethane.

Example XV

This example illustrates the preparation of copolyester in ortho-dichlorobenzene (o-Cl$_2$C$_6$H$_4$) solvent using TeClDPP, isophthaloyl chloride (ICl), terephthaloyl chloride (TCl) and anhydrous aluminum chloride. Using the general procedure outlined in Example XIV except the resin kettle was placed in an oil bath maintained at 175° C., a copolyester is prepared from 45.7 g. (0.125 mole) of TeClDPP, 17.8 g. (.0875 mole) ICl, 7.6 g. (0.0375 mole) TCl, 0.18 g. (1.35×10$^{-3}$ moles) anhydrous aluminum chloride and 250 cc. of o-Cl$_2$C$_6$H$_4$. After drying overnight in a vacuum oven, the polymer exhibits inherent viscosity of 1.00 in sym-tetrachloroethane.

Example XVI

This example illustrates the preparation of a polyester using TeClDPP, isophthaloyl chloride (ICl) and anhydrous antimony pentafluoride.

In an enclosed chamber under a dry nitrogen atmosphere, 45.7 g. (0.125 mole) of TeClDPP, 200 ml. of sym-tetrachloroethane and 25.4 g. (0.125 mole) of ICl are placed in a previously dried 500 cc. capacity resin kettle equipped with a Teflon® TFE-fluorocarbon coated egg beater stirrer and "Teflon" bushing, a Friedrich condenser, and a nitrogen inlet tube terminating above the surface of the reaction mixture. A solution containing 0.30 g. (1.39×10$^{-3}$ moles) of freshly distilled antimony fluoride is added to the kettle and the apparatus is removed from the chamber and the contents are maintained under a positive nitrogen flow with vigorous stirring. After 2 hours a sample is isolated by pouring into n-hexane (Waring Blendor) and washing three times with methanol in a blender. After drying overnight in a vacuum oven at 110° C., the polymer exhibits an inherent viscosity of 0.67 in sym-tetrachloroethane.

Example XVII

This example illustrates the preparation of a polyester using TeClDPP, isophthaloyl chloride (ICl) and anhydrous aluminum bromide.

In an enclosed chamber under a dry nitrogen atmosphere, 45.7 g. (0.125 mole) of TeClDPP, 0.36 g. (1.35×10$^{-3}$ moles) of anhydrous aluminum bromide, 250 ml. of sym-tetrachloroethane and 25.4 g. (0.125 mole) of ICl are placed in a previously dried 500 cc. capacity resin kettle equipped with a Teflon®-coated egg beater stirrer and "Teflon" bushing, a Friedrich condenser, and a nitrogen inlet tube terminating above the surface of the reaction mixture. The apparatus is removed from the chamber and the contents are maintained under a positive nitrogen flow. The reaction mixture is stirred vigorously and refluxing of solvent is continued for 1.5 hours by immersion in a preheated 165 to 175° C. oil bath. The resulting very viscous polymer solution is allowed to cool, after which 0.5 cc. of water is added with stirring to hydrolyze the catalyst. Polymer is isolated by pouring the viscous dope into n-hexane (Waring Blendor) and washing with methanol in a blender. After drying overnight in a vacuum oven at 120° C., the polymer exhibits an inherent viscosity of 1.39 in sym-tetrachloroethane.

I claim:

1. A process for preparing a fiber-forming polyester comprising reacting a diacyl chloride and a diphenol or a bisphenol under anhydrous conditions in a chlorinated hydrocarbon solvent capable of dissolving the resulting polyester, and in the presence of a catalytic amount of a Lewis acid catalyst selected from the group consisting of anhydrous aluminum chloride, anhydrous aluminum bromide, anhydrous aluminum iodide, antimony pentafluoride, antimony pentabromide, antimony pentachloride, ferric chloride, ferric bromide, indium trichloride, indium tribromide, zirconium chloride, zirconium bromide, stannic chloride, stannic bromide, titanium tetrachloride, titanium tetrabromide, gallium trichloride, and gallium tribromide for a sufficient period of time to produce said polyester.

2. Process according to claim 1 wherein the diacyl chloride is reacted with a substantially equimolar amount of the diphenol or bisphenol.

3. Process according to claim 1 wherein said solvent is 1,1,2,2-tetrachloroethane.

4. Process according to claim 1 wherein said diacylchloride is a mixture consisting of from 30 to 90% isophthaloyl chloride and from 70 to 10% terephthaloyl chloride and said solvent is o-dichlorobenzene.

5. The process of claim 1 wherein the said polyester prepared is poly[4,4' - isopropylidene-bis(2,6 - dichlorophenyl)isophthalate], the said diacyl chloride is isophthaloyl chloride and the said bisphenol is 2,2-bis(4-hydroxy-3,5-dichlorophenyl)-propane.

6. Process according to claim 1 wherein said catalyst is anhydrous aluminum chloride.

7. Process according to claim 3 wherein said catalyst is anhydrous aluminum chloride.

8. Process according to claim 1 wherein said catalyst is anhydrous aluminum bromide.

9. Process according to claim 1 wherein said catalyst is antimony pentachloride.

10. Process according to claim 1 wherein said catalyst is antimony pentafluoride.

11. Process according to claim 1 wherein said catalyst is antimony pentabromide.

12. Process according to claim 1 wherein said catalyst is anhydrous aluminum iodide.

13. Process according to claim 1 wherein said catalyst is ferric chloride.

14. Process according to claim 1 wherein said catalyst is ferric bromide.

15. Process according to claim 1 wherein said catalyst is indium trichloride.

16. Process according to claim 1 wherein said catalyst is indium tribromide.

17. Process according to claim 1 wherein said catalyst is zirconium chloride.

18. Process according to claim 1 wherein said catalyst is zirconium bromide.

19. Process according to claim 1 wherein said catalyst is stannic chloride.

20. Process according to claim 1 wherein said catalyst is stannic bromide.

21. Process according to claim 1 wherein said catalyst is titanium tetrachloride.

22. Process according to claim 1 wherein said catalyst is titanium tetrabromide.

23. Process according to claim 1 wherein said catalyst is gallium trichloride.

24. Process according to claim 1 wherein said catalyst is gallium tribromide.

References Cited

UNITED STATES PATENTS 3,223,677  12/1965  Matzner _____ 260—47
3,223,725  12/1965  Hill.

OTHER REFERENCES

Satchell: J. Chem. Soc., 1961, 5404–15.

Raudsepp et al.: Trudy Tallin Politekh. Inst. Ser. A 1958, 226–41.

Morgan: "Condensation Polymers by Interfacial and Solution Methods," Interscience, New York, 1965, chapter VIII relied on but not supplied.

MELVIN GOLDSTEIN, Primary Examiner

U.S. Cl. X.R.

260—33.8 R

PO-1050
(5/69)

UNITED STATES PATENT OFFICE
CERTIFICATE OF CORRECTION

Patent No. 3,702,838      Dated November 14, 1972

Inventor(s) Donald Richard Wilson

It is certified that error appears in the above-identified patent and that said Letters Patent are hereby corrected as shown below:

Column 1, line 7, "Ser. No. 779,090" should read -- Ser. No. 770,090 -- .

Signed and sealed this 1st day of May 1973.

(SEAL)
Attest:

EDWARD M. FLETCHER, JR.      ROBERT GOTTSCHALK
Attesting Officer      Commissioner of Patents